(12) United States Patent
Sugashima et al.

(10) Patent No.: US 12,341,798 B2
(45) Date of Patent: Jun. 24, 2025

(54) LOG MANAGEMENT DEVICE, LOG MANAGEMENT METHOD, COMPUTER PROGRAM PRODUCT, AND SECURITY ATTACK DETECTION AND ANALYZING SYSTEM

(71) Applicant: DENSO CORPORATION, Kariya (JP)

(72) Inventors: Takeshi Sugashima, Kariya (JP); Masumi Egawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 195 days.

(21) Appl. No.: 18/151,680

(22) Filed: Jan. 9, 2023

(65) Prior Publication Data

US 2023/0156027 A1 May 18, 2023

Related U.S. Application Data

(63) Continuation of application No. PCT/JP2021/021285, filed on Jun. 3, 2021.

(30) Foreign Application Priority Data

Jul. 14, 2020 (JP) .................. 2020-120721

(51) Int. Cl.
*H04L 9/40* (2022.01)
*H04L 41/5067* (2022.01)
*H04W 12/122* (2021.01)

(52) U.S. Cl.
CPC ...... *H04L 63/1425* (2013.01); *H04L 41/5067* (2013.01); *H04L 63/1416* (2013.01); *H04W 12/122* (2021.01)

(58) Field of Classification Search
CPC . H04L 63/1425; H04L 63/145; H04L 9/3247; H04L 12/40; H04L 47/24; H04L 12/40013; H04L 63/20; H04L 9/14; H04L 67/30; H04L 67/61; H04L 63/14; H04L 12/4641; G06F 21/56; G06F 9/45533;
(Continued)

(56) References Cited

U.S. PATENT DOCUMENTS 8,839,435 B1 * 9/2014 King .................. H04L 63/1425
726/22
2006/0217116 A1 * 9/2006 Cassett ............... H04L 41/5067
455/423

(Continued)

FOREIGN PATENT DOCUMENTS

CN 107547740 A * 1/2018
JP 2018-032254 A 3/2018
(Continued)

*Primary Examiner* — Kyung H Shin
(74) *Attorney, Agent, or Firm* — Harness, Dickey & Pierce, P.L.C.

(57) ABSTRACT

A log management device includes a log collection unit configured to receive a log generated by a security sensor, a storage unit configured to store the log, a statistical analysis unit configured to obtain a statistical calculation result by performing statistical analysis on a plurality of the logs, a control unit configured to determine which of the log and the statistical calculation result is to be sent according to a predetermined condition, and a transmission unit configured to transmit at least one of the log or the statistical calculation result according to the predetermined condition.

14 Claims, 7 Drawing Sheets

(58) Field of Classification Search
CPC .............. G06F 9/45558; G06F 21/606; H04W 12/122; H04W 12/121; G06N 3/045
See application file for complete search history.

(56) References Cited

U.S. PATENT DOCUMENTS

| | | |
|---|---|---|
| 2019/0141072 A1 | 5/2019 | Sasaki |
| 2019/0156593 A1 | 5/2019 | Sasaki |
| 2019/0182275 A1 | 6/2019 | Ando et al. |
| 2019/0379683 A1* | 12/2019 | Overby .............. H04W 12/122 |
| 2020/0336504 A1 | 10/2020 | Maeda et al. |
| 2021/0056776 A1 | 2/2021 | Sasaki |
| 2021/0112085 A1 | 4/2021 | Sasaki |
| 2021/0320937 A1 | 10/2021 | Aso et al. |

FOREIGN PATENT DOCUMENTS

| | | |
|---|---|---|
| JP | 2019-087277 A | 6/2019 |
| JP | 2020-038439 A | 3/2020 |
| WO | WO-2019-193786 A1 | 10/2019 |

* cited by examiner

LOG MANAGEMENT DEVICE, LOG MANAGEMENT METHOD, COMPUTER PROGRAM PRODUCT, AND SECURITY ATTACK DETECTION AND ANALYZING SYSTEM

CROSS REFERENCE TO RELATED APPLICATION

The present application is a continuation application of International Patent Application No. PCT/JP2021/021285 filed on Jun. 3, 2021, which designated the U.S. and claims the benefit of priority from Japanese Patent Application No. 2020-120721 filed on Jul. 14, 2020. The entire disclosures of all of the above applications are incorporated herein by reference.

TECHNICAL FIELD

The present disclosure relates to a security attack detection and analyzing system which is configured to detect and analyze cyber attacks and includes a log management device mainly mounted in a moving body and a center device provided outside the moving body.

BACKGROUND

In recent years, technologies for driving support and automated driving control, including V2X such as vehicle-to-vehicle communication and road-to-vehicle communication, have been attracting attention. Along with this, vehicles have come to be equipped with a communication function, and the vehicles are becoming more connected. As a result, the vehicles may be increasingly vulnerable to cyber attacks. Since control of a vehicle may be lost due to a cyber attack due to the high speed of the vehicle traveling, stronger defense means against the cyber attack is required.

In the field of computer systems, measures have been taken against cyber attacks for some time.

SUMMARY

A log management device according to an aspect of the present disclosure includes: a log collection unit configured to receive a log generated by a security sensor; a storage unit configured to store the log; a statistical analysis unit configured to obtain a statistical calculation result by performing statistical analysis on a plurality of the logs; and a transmission unit configured to transmit at least one of the log or the statistical calculation result according to a predetermined condition.

A log management method for a log management device according to another aspect of the present disclosure includes: receiving a log generated by a security sensor; storing the log; obtaining a statistical calculation result by performing statistical analysis on a plurality of the logs; and transmitting at least one of the log or the statistical calculation result according to a predetermined condition.

A computer program product according to another aspect of the present disclosure is stored on at least one non-transitory computer readable medium and includes instructions configured to, when executed by at least one processor of a log management device, cause the at least one processor to: receive a log generated by a security sensor; store the log; obtain a statistical calculation result by performing statistical analysis on a plurality of the logs; determine which of the log and the statistical calculation result is to be sent according to a predetermined condition; and transmit at least one of the log or the statistical calculation result according to the predetermined condition.

A security attack detection and analyzing system according to another aspect of the present disclosure includes a log management device and a center device. The log management device includes a log collection unit configured to receive a log generated by a security sensor, a storage unit configured to store the log, a statistical analysis unit configured to obtain a statistical calculation result by performing statistical analysis on a plurality of the logs, and a transmission unit configured to transmit at least one of the log or the statistical calculation result according to a predetermined condition. The center device includes a receiving unit configured to receive the at least one of the log or the statistical calculation result, an analysis unit configured to analyze the at least one of the log or the statistical calculation result, and generate an upload request for at least one of an additional log or an additional statistical calculation result based on a result of the analysis, and a transmission unit configured to transmit the upload request to the log management device.

EMBODIMENTS

Comparative Example

Figure 1:
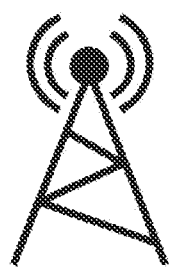
FIG. 1 is a diagram illustrating an example of a security attack detection and analyzing system according to an embodiment of the present disclosure.
Figure 1:
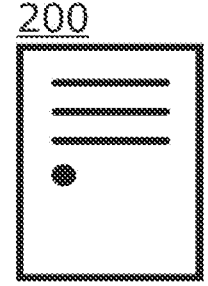
Figure 1:
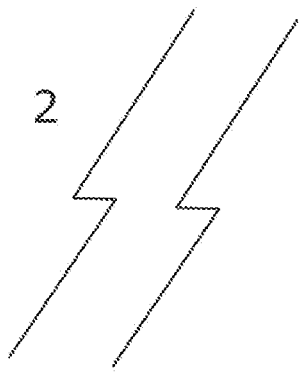
Figure 1:
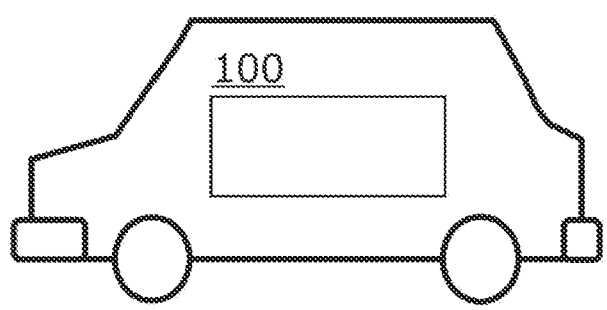

A log output device of a comparative example of the present disclosure is configured to determine whether to output the security log.

Here, the present inventors have found the following problems. The security sensor is mounted on the electronic control unit (ECU) of a vehicle which is a moving body, and the security sensor monitors the ECU and the communication of the ECU to output the security log. If all security logs are uploaded to the center device for analysis, the amount of communication becomes large. Generally, the center device has a higher processing capacity than the electronic control unit mounted in the vehicle. Accordingly, the center device may detect anomalies even when the electronic control unit mounted in the vehicle don't detect anomalies. Further, even when the center device performs the anomaly detection, the information such as the security log may not be enough. In this case, if additional information can be obtained from the vehicle or vehicles of the same type, more accurate anomaly detection and analysis for multiple vehicles can be performed.

Embodiments of the present disclosure will be described below with reference to the drawings.

The present invention referred hereinafter indicates the invention described in the claims, and is not limited to the following embodiments. Further, at least words inside the double quotation means words and phrases described in the claims, and are not limited to the following embodiments.

Configurations and methods descried in dependent claims should be interpreted as arbitrary configurations and arbitrary methods within descriptions in independent claim. Configurations and methods of following embodiments corresponding to configurations and methods described in dependent claims, and configurations and methods described only in the following embodiments without descriptions in claims should be interpreted as arbitrary configurations and arbitrary methods in this disclosure. In a case that the scope of claims is broader than descriptions of the embodiments, configurations and methods described in the following embodiments are just examples of configurations and methods of the present disclosure, which should be interpreted as arbitrary configurations and arbitrary methods in this disclosure. In any cases, essential configurations and methods of this disclosure should be interpreted based on independent claims.

Any effects described in the embodiments are effects obtained by a configuration of an embodiment as an example of this disclosure, and are not necessarily effects of this disclosure.

When there are a plurality of embodiments, the configuration disclosed in each embodiment is not limited to each embodiment alone, and may be combined across the embodiments. For example, the configuration disclosed in one embodiment may be combined with another embodiment. Further, the disclosed configurations may be collected and combined in each of the plurality of embodiments.

The problem described in this disclosure is not a publicly known problem, but person including the inventor has independently found out, and is a fact that affirms the inventive step of the invention together with the configuration and method of the present disclosure.

1. First Embodiment (1) Overall Configuration of Security Attack Detection and Analyzing System First, the overall configuration of the security attack detection and analyzing system of the embodiment will be described with reference to FIG. 1.

The security attack detection and analyzing system 1 includes a log management device 100 and a center device 200.

The log management device 100 is connected to the center device 200 via a communication network 2. In the embodiment, the log management device 100 is mounted in a vehicle which is a moving body. However, the log management device 100 may be mounted on a fixed object instead of the moving body. The moving body refers to a movable object, and a travel speed is not limited. Naturally, this also includes a case where the mobile object is stopped. For example, the moving body includes, but is not limited to, vehicles, motorcycles, bicycles, pedestrians, ships, aircraft, and objects mounted on these. The log management device 100 may be directly fixed to the moving body. The log management device 100 may move together with the moving body without being fixed to the moving body. For example, the log management device 100 may be carried by a person on the moving body, or the log management device 100 may be mounted on a load placed on the moving body.

In a case of a wireless communication system, for example, IEEE 802.11 (WiFi (registered trademark)), IEEE 802.16 (WiMAX (registered trademark)), (Wideband Code Division Multiple Access (W-CDMA), High Speed Packet Access (HSPA), Long Term Evolution (LTE), Long Term Evolution Advanced (LTE-A), 4G, 5G, or the like may be used as the communication network 2. Alternatively, Dedicated Short Range Communication (DSRC) may be used. The communication network 2 may further include a wired communication system, such as a local area network (LAN), the Internet, or a fixed telephone line. An example of a case where a wired communication system is used is a case where a vehicle is parked in a parking lot or a case where a vehicle is housed in a repair shop. A combination of the wireless communication system and the wired communication system may be used as the wireless communication network. For example, the log management device 100 and a base station device in a cellular system may be connected to each other via the wireless communication system, and the base station device and the center device 200 may be connected to each other via the wired communication system such as a core line of a communication carrier or the Internet.

(2) Configuration of Log Management Device

Figure 2:
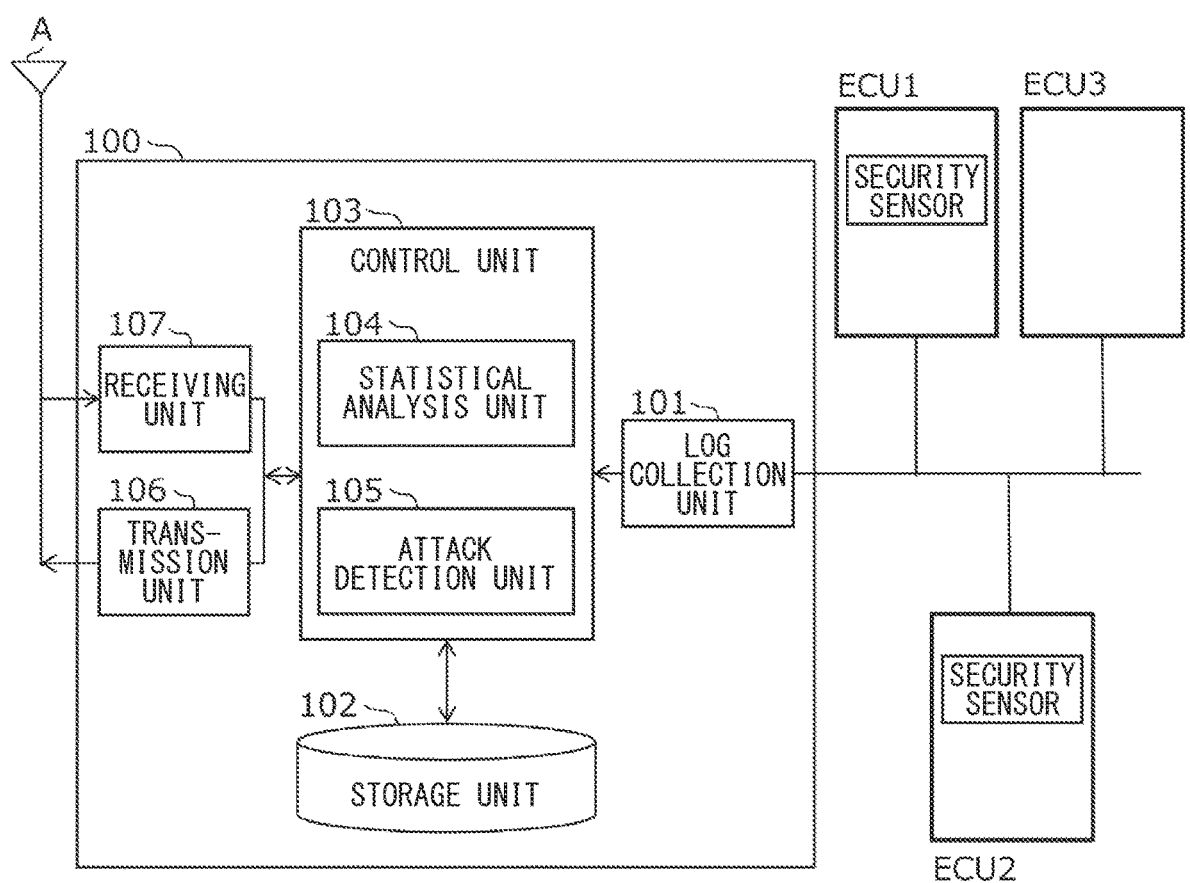
FIG. 2 is a block diagram illustrating a configuration example of a log management device according to the embodiment of the present disclosure.

A configuration of the log management device 100 of the present embodiment will be described with reference to FIG. 2.

The log management device 100 includes a log collection unit 101, a storage unit 102, a control unit 103, a transmission unit 106, and a receiving unit 107. The control unit 103 is configured to build a statistical analysis unit 104 and an attack detection unit 105.

The log management device 100 may include a general-purpose central processing unit (CPU), a volatile memory such as a RAM, a non-volatile memory such as a ROM, a flash memory, or a hard disk, various interfaces, and an internal bus connecting the constituents to each other. Then, by executing software on these hardware, the log management device 100 can be configured to perform the functions of each functional block described in FIG. 2. The same applies to the center device 200 illustrated in FIG. 3 that will be described later. Of course, these devices may be implemented by dedicated hardware such as an LSI.

As the log management device 100, a form of an electronic control device (electronic control unit (hereinafter abbreviated to ECU)) as a semifinished product in the present embodiment is supposed, but the present disclosure is not limited thereto. For example, a form of a component may be a semiconductor circuit or a semiconductor module, and a form of a finished product may be a personal computer (PC), a smartphone, a cellular phone, or a navigation system. The log management device 100 may have multiple ECUs in addition to a single ECU. For example, a communication ECU may perform communication with the outside. Alternatively, multiple ECUs including the communication ECU may be understood as the log management device 100 of the present embodiment by changing the viewpoint.

The log collection unit 101 is connected to one or more ECUs connected to the log management device 100 via the in-vehicle network, and is configured to receive security log transmitted from the security sensor provided in each ECU. The security sensor is configured to monitor the ECU and the communication between the ECUs, detect anomalies such as attacks, and reports normality and anomalies by the security log. In FIG. 2, the log collection unit 101 is connected to the ECU1, ECU2, and ECU3 via the in-vehicle network. The ECU1 and ECU2 are equipped with the security sensor configured to monitor the ECU and the communication between the ECUs. The ECU3 is not equipped with the security sensor. The ECU1, ECU2, and ECU3 may also have a defense function and a function of generating a log for notifying the operating state of each ECU. Then, instead of the security log, or together with the security log, this log may be processed in the present embodiment.

The ECU 1, ECU 2, and ECU 3 may be any ECUs, and include, for example, a drive system electronic control device controlling an engine, a steering wheel, a brake, and the like, a vehicle body system electronic control device controlling a meter, a power window, and the like, an information system electronic control device such as a navigation apparatus, or a safety control system electronic control device performing control for preventing collision with an obstacle or a pedestrian. The ECUs may be classified into a master and a slave instead of being in parallel.

As the in-vehicle network, for example, in addition to a communication system such as a Controller Area Network (CAN) and a Local Interconnect Network (LIN), any communication system such as Ethernet (registered trademark), Wi-Fi (registered trademark) and Bluetooth (registered trademark) may be used.

The storage unit 102 stores the logs collected by the log collection unit 101 from the log collection unit 101 via the control unit 103 or directly from the log collection unit 101. The storage unit 102 may store results of statistical calculation by the statistical analysis unit 104. The storage unit 102 includes a non-volatile memory or a volatile memory.

The control unit 103 is configured to control operations of the log collection unit 101, the storage unit 102, the transmission unit 106, and the receiving unit 107. Further, the control unit 103 is configured to build the statistical analysis unit 104 and the attack detection unit 105.

The statistical analysis unit 104 is configured to obtain statistical calculation results by performing statistical analysis on the security logs collected by the log collection unit 101. Examples of the statistical analysis include, for example, the number of occurrences, frequency, temporal distribution, or correlation of security logs of the same type. Other examples include the number of times, frequency, temporal distribution, or correlation of attack detection results specified from the security log by the attack detection unit 105, which will be described later. Thus, statistical analysis of the security logs includes both direct and indirect statistical analysis of security logs.

The attack detection unit 105 is configured to obtain the attack detection results by performing attack detection based on the security log collected by the log collection unit 101. The attack detection includes multiple stages such as attack identification, attack path identification, and damaged location identification, and the attack detection unit 105 should be able to perform at least one of these. The attack identification is identifying that an anomaly is caused by a security attack. The attack path identification refers to identifying that the attack is made via which ECU or which network. The damaged location identification refers to identifying which ECU or which network is damaged. As described above, the attack detection result obtained by the attack detection unit 105 may be analyzed by the statistical analysis unit 104. In this case, the attack detection unit 105 is configured to indirectly perform the statistical analysis on the security log.

The transmission unit 106 is configured to transmit the security log or the statistical calculation result to the center device via an antenna A according to a predetermined condition. As a specific example, the transmission unit 106 is configured to transmit the security log or the statistical calculation result according to the predetermined condition. The predetermined condition includes, for example, the number of the detected attack, an upload request received from the center device, and the amount of the security log in addition to the upload request. These are described in the section on the operations of the log management device below. The control unit 103 is configured to determine whether the predetermined condition is satisfied. The predetermined condition may be an internal condition related to the log and the statistical calculation result, or an external condition based on instructions or information from external devices.

When a communication ECU performing external communication is provided separately from the log management device, the transmission unit 106 transmits the security log and the statistical calculation result to the communication ECU. However, also in this case, the transmission unit 106 transmits the security log and the statistical calculation result to the center device 200 via the communication ECU.

The receiving unit 107 is configured to receive, from the center device 200 via the antenna A, an upload request for uploading the security log and the statistical calculation result.

(3) Configuration of the Center Device

Figure 3:
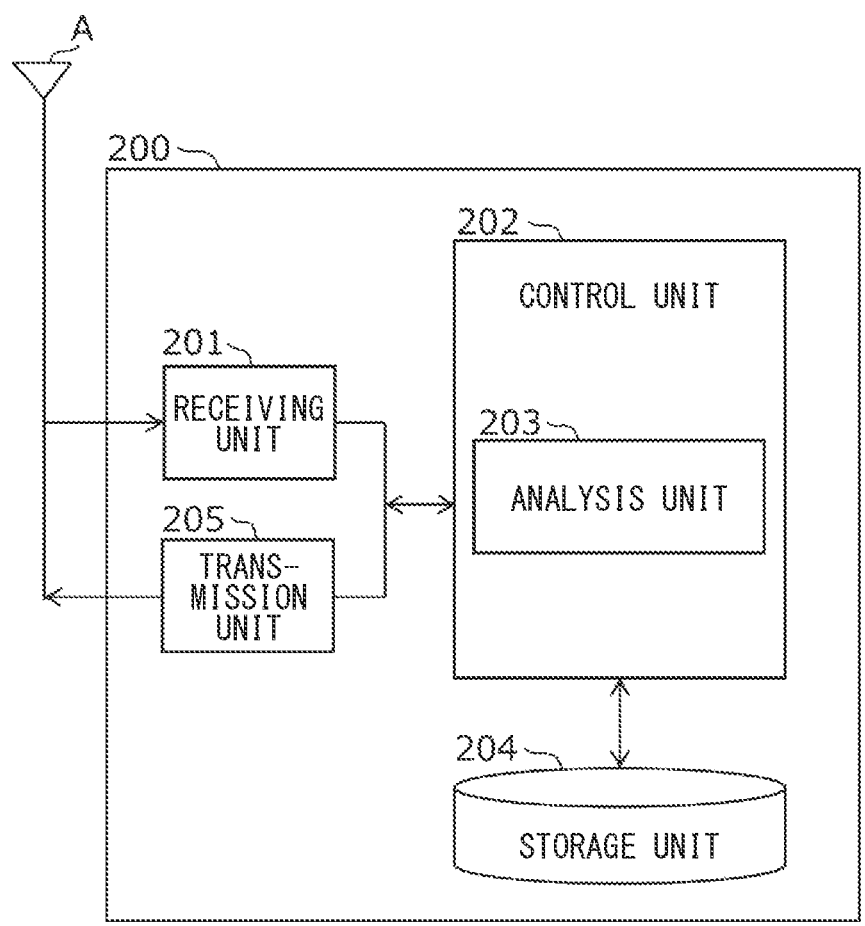
FIG. 3 is a block diagram illustrating a configuration example of a center device according to the embodiment of the present disclosure.

A configuration of the center device 200 of the present embodiment will be described with reference to FIG. 3.

The center device 200 includes a receiving unit 201, a control unit 202, a storage unit 204, and a transmission unit 205. The control unit 202 is configured to build an analysis unit 203.

In the present embodiment, as the center device 200, a form of a server device as a finished product is supposed, but the present disclosure is not limited thereto. For example, a form of a finished product may be a workstation or a personal computer (PC), a form of a semifinished product may be an ECU, and a form of a component may be a semiconductor circuit element.

The receiving unit 201 is configured to receive, via the antenna A, the security log or the statistical calculation result transmitted from the log management device 100.

The control unit 202 is configured to control operations of the receiving unit 201, the storage unit 204, and the transmission unit 205. The control unit 202 is configured to build the analysis unit 203.

The analysis unit 203 is configured to analysis the security log or the statistical calculation result received by the receiving unit 201. The analysis unit 203 is configured to generate, based on the analysis result, the upload request for requesting the log management device 100 to upload additional log or additional statistical calculation result.

The upload request may be transmitted to different part than the log management device 100 which originally transmitted the security log or the statistical calculation result. For example, the upload request may be transmitted to the log management device 100 mounted in another vehicle of the same type. The vehicle of the same type refers to a vehicle of the same model, a vehicle equipped with the same parts, a vehicle equipped with the same platform, and the like.

The storage unit 204 is configured to store the security log and the statistical calculation result received by the receiving unit 201. The storage unit 204 may be configured to store the upload request generated by the analysis unit 203.

The transmission unit 205 is configured to transmit the upload request to the log management device which originally transmitted the security log and the statistical calculation result, and/or the log management device 100 mounted in another vehicle of the same type.

(2) Configuration of the Log Management Device

Operations of the log management device 100 of the present embodiment will be described with reference to flowcharts of FIGS. 4, 5. The following operations not only indicate a log management method executed by the log management device 100 but also indicate processing procedures in a log management program executable by the log management device 100. The order of the processes is not limited to the example shown in FIGS. 4, 5. That is, the order may be swapped as long as there is no restriction, such as a relationship where one step uses the result of the step before it.

Figure 4:
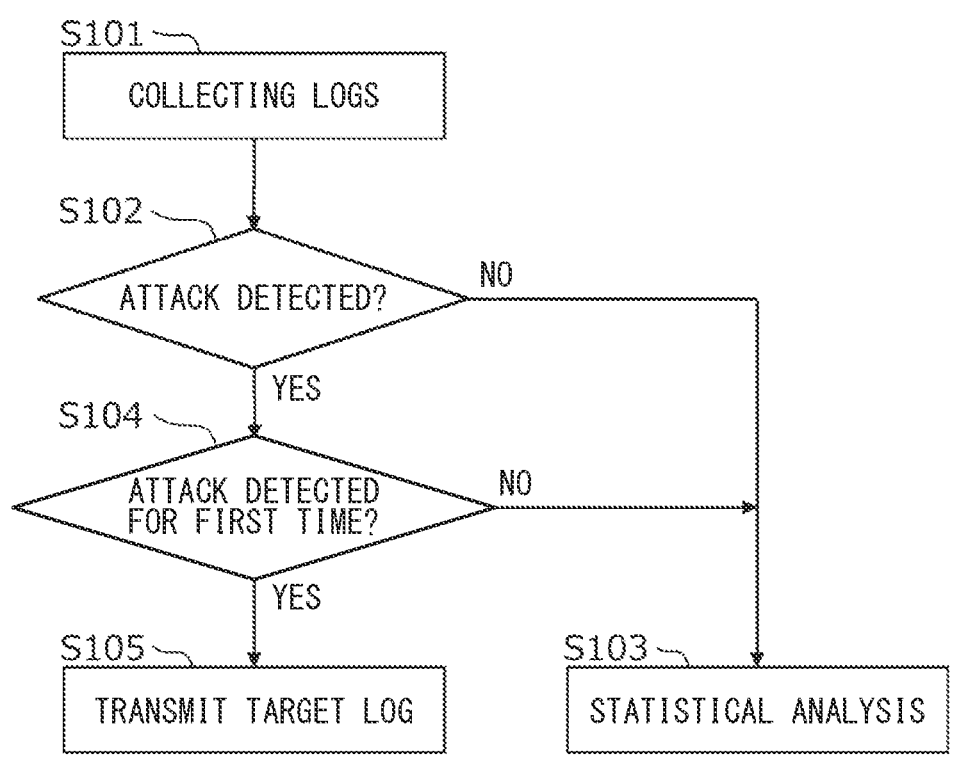
FIG. 4 is a flowchart illustrating operations of the log management device according to the embodiment of the present disclosure.

FIG. 4 shows the operations related to the log collection regularly performed by the log management device 100. In S101, the log collection unit 101 receives the security log generated and transmitted by the security sensors of the ECU1, and ECU2. The storage unit 102 stores the security log.

In S102, the attack detection unit 105 performs the attack detection based on the received security log. The attack detection is at least one of the attack identification, the attack path identification, and the damaged location identification. When the attack is not detected (S102: No), the statistical analysis is performed on the normal log to obtain the statistical calculation result. When the attack is detected (S102: Yes), the process proceeds to S104.

When the attack detection unit 105 detected the attacks a predetermined number of times or more, the statistical analysis unit 104 obtains the statistical analysis unit by performing the statistical analysis. When the predetermined condition is the number of detected attacks, the control unit 103 instructs the transmission unit 106 to transmit the security log to the center device 200 when the number of the detected attack is at or below the predetermined number, and the transmission unit 106 transmits the security log to the center device 200. When the number of the detected attack is at or above the predetermined number of times, the control unit 103 instructs the transmission unit 106 to transmit the statistical calculation result to the center 200 after receiving the upload request from the center device 200, and the transmission unit 106 transmits the statistical calculation result to the center device 200. Here, "at or above" may be changed with "above". "At or below" may be changed with "below".

In the present embodiment, when the attack is detected for the first time (S104: Yes), the control unit 103 instructs the transmission unit 106 to transmit the security log from which the attack is detected to the center device 200. In S105, the transmission unit 106 transmits the security log to the center device 200. The transmission unit 106 may transmit, along with the security log, vehicle information output from a vehicle state monitoring function and indicating a vehicle state, and statistical calculation result on the vehicle information. The same applies to the next paragraph.

In the present embodiment, when the attack is detected for the second time or more (S104: No), the statistical analysis unit 104 performs statistical analysis on the security logs to obtain the statistical calculation result in S103. For example, the statistical analysis unit 104 calculates the number of occurrences, frequency, temporal distribution, or correlation of security logs of the same type. Alternatively, the statistical analysis unit obtains the number of times, frequency, temporal distribution, or correlation of attack detection results specified from the security log by the attack detection unit 105. The control unit 103 instructs the transmission unit 106 to transmit the statistical calculation result after receiving the upload request from the center device 200, and then the transmission unit 106 transmits the statistical calculation result. After transmitting the statistical calculation result, the number of attacks is reset. The transmission unit 106 may be configured to transmit the statistical calculation result promptly.

In S104, the predetermined number that is the predetermined condition is one. However, the predetermined number may be two or more. For example, when the predetermined number is three, the security log is transmitted until the anomaly is detected three times, and the statistical calculation result is obtained by statistical analysis after fourth time to transmit the statistical calculation result after receiving the upload request from the center device 200.

A condition other than the number of detected number of attacks may be set as the predetermined condition. For example, the number or frequency of times security logs may be set as the predetermined condition.

The predetermined conditions may be automatically changeable as needed or according to situations. The content of the statistical analysis may be automatically changeable as needed or according to situations.

According to the present embodiment, since the security log or the statistical calculation result is selectively transmitted according to the number of attacks, all logs are not transmitted to the center device, and accordingly the communication volume can be reduced. According to the present embodiment, since the statistical calculation result is transmitted after receiving the request from the center device 200, the statistical calculation result is transmitted only when the center device 200 determines to transmit it, and accordingly the communication volume can be reduced. According to the present embodiment, center device 200 is not necessary to calculate the statistical calculation result, and accordingly the processing amount can be reduced.

Figure 5:
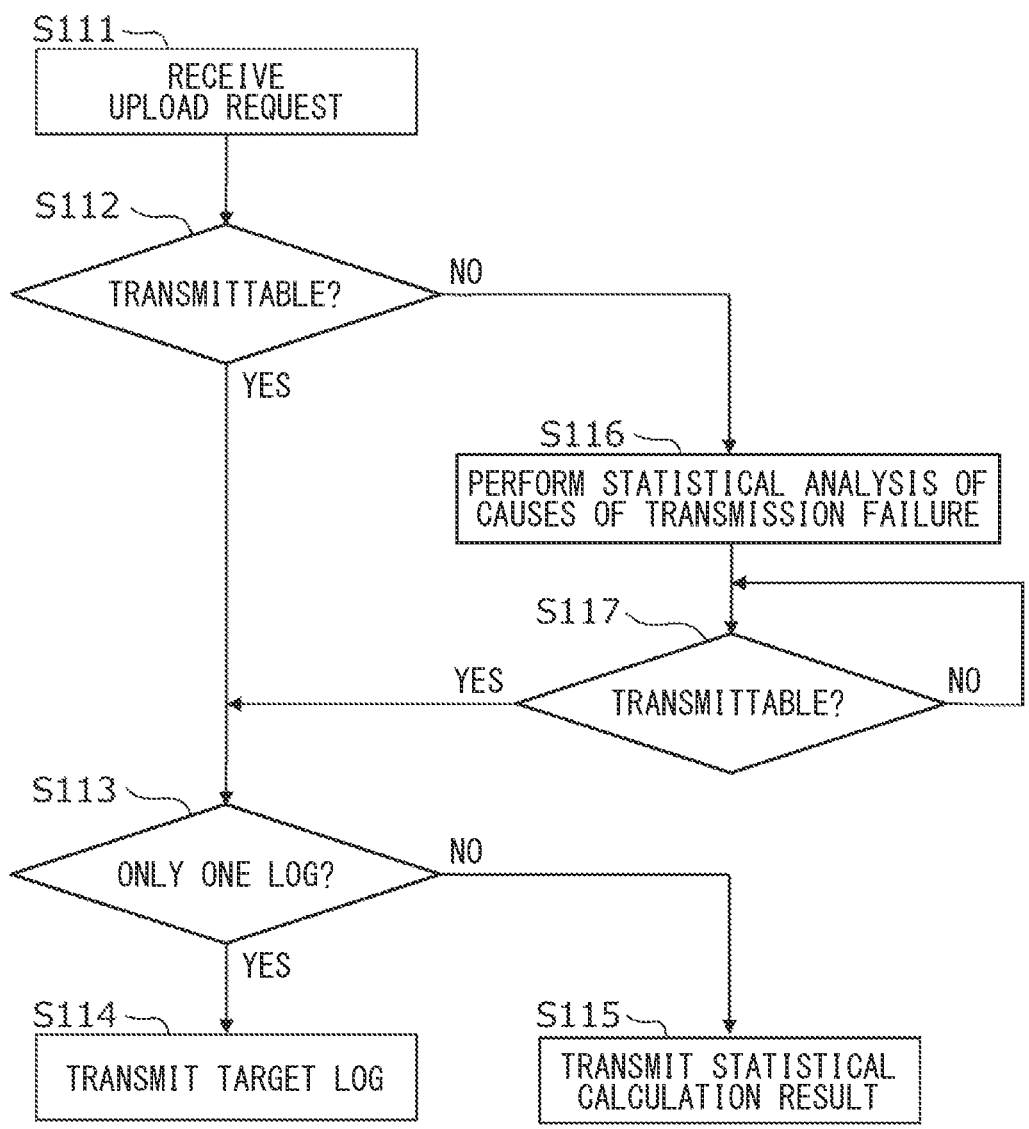
FIG. 5 is a flowchart illustrating operations of the log management device according to the embodiment of the present disclosure.

FIG. 5 is a flowchart illustrating operations performed when the log management device 100 receives the upload request from the center device 200. That is, the predetermined condition is the upload request. In S111, the receiving unit 107 receives the upload request from the center device 200.

In S112, the control unit 103 determines whether the security log or the statistical calculation result is transmittable. In the determination, the vehicle information output from the vehicle state monitoring function (not shown) is used. For example, since only standby power is available when the vehicle is in sleep mode, it is determined in S112 that the security log or the statistical calculation result is not transmittable. When it is determined that the security log or the statistical calculation result is transmitted, the process proceeds to S113.

When the predetermined condition is the amount of security logs, the control unit 103 instructs the transmission unit 106 to transmit the security log to the center device 200 when the number of the detected attack is at or below the predetermined amount, and the transmission unit 106 transmits the security log to the center device 200. When the amount of the security log is at or above the predetermined amount, the control unit 103 instructs the transmission unit 106 to transmit the statistical calculation result to the center 200, and the transmission unit 106 transmits the statistical calculation result to the center device 200. Here, the "amount" includes the number of logs, the reception frequency of receiving logs, and the like, in addition to the size of the log. "At or above" may be changed with "above". "At or below" may be changed with "below".

In the present embodiment, when the number of the security log is one (S113: Yes), the control unit 103 instructs the transmission unit 106 to transmit the security log to the center device 200. In S114, the transmission unit 106 transmits the security log to the center device 200.

In the present embodiment, when the number of the security log is two or more (S113: No), the control unit 103 instructs the transmission unit 106 to transmit the statistical calculation result to the center device 200. In S115, the transmission unit 106 transmits the statistical calculation result to the center device 200.

When the determination result of S112 is "No", the statistical analysis unit 104 performs a statistical analysis in S116 to reveal the reason why the security log is not transmittable. When the security log becomes transmittable (S117: Yes), the process proceeds to S113 based on the latest one of upload request in the upload requests which have received. An example of when the security log becomes transmittable is the next IG-ON (ignition on) timing. When the security log becomes transmittable (S117: Yes), the reason, i.e. the statistical calculation result of the statistical analysis, why the security log had not been transmittable may be transmitted.

In S113, the number of the security log which is the predetermined condition is one, but the number of the security log may be two or more. For example, when the number of the security log is set to be three, the security log may be transmitted until the number of the security log reaches three, and the statistical calculation result may be transmitted when the number of the security log is four or greater.

A condition other than the number of security log may be set as the predetermined condition.

The predetermined conditions may be automatically changeable as needed or according to situations. The content of the statistical analysis may be automatically changeable as needed or according to situations.

According to the present embodiment, since the security log or the statistical calculation result is selectively transmitted according to the number of the security log, all logs are not transmitted to the center device, and accordingly the communication volume can be reduced. According to the present embodiment, since the statistical calculation result is transmitted after receiving the request from the center device 200, the statistical calculation result is transmitted only when the center device 200 determines to transmit it, and accordingly the communication volume can be reduced. According to the present embodiment, the center device 200 is not necessary to calculate the statistical calculation result which is used to be necessary in the analysis, and accordingly the processing amount can be reduced. That is, the volume of the communication with the center device 200 can be reduced without decreasing the analysis accuracy of the center device 200.

(3) Operations of the Center Device

Operations of the center device 200 of the present embodiment will be described with reference to flowcharts of FIGS. 6, 7. The operations below show not only the security attack and analyzing method performed by the center device 200, but also the processing procedure of the security attack and analyzing program executable by the center device 200. The order of the processes is not limited to the example shown in FIGS. 6, 7. That is, the order may be swapped as long as there is no restriction, such as a relationship where one step uses the result of the step before it.

Figure 6:
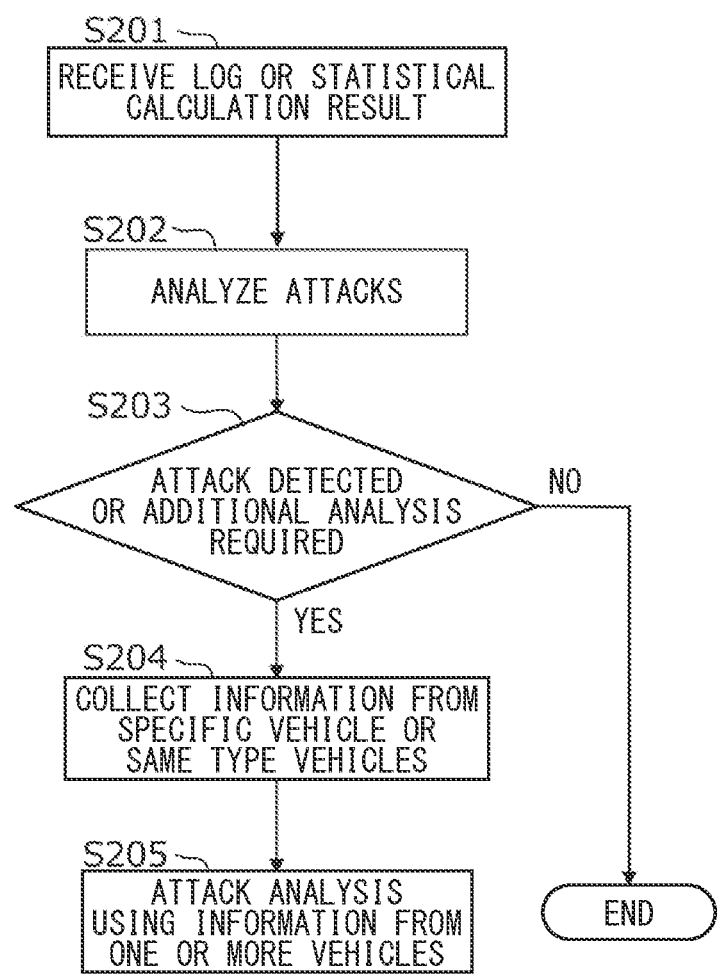
FIG. 6 is a flowchart illustrating operations of the center device according to the embodiment of the present disclosure.

FIG. 6 shows the operations of the center device 200 performed in response to receiving the security log or the statistical calculation result. In S201, the receiving unit 201 of the center device 200 receives the security log or the statistical calculation result transmitted from a specific vehicle. The security log or the statistical calculation result received here may be those (S105, S103) based on the regular rog collection of the specific vehicle shown in FIG. 4, or those (S114, S115) transmitted in response to the upload request from the center device 200 shown in FIG. 5. That is, the flowchart shown in FIG. 6 is performed in conjunction with FIGS. 4, 5.

In S202, the analysis unit 203 performs attack analysis using the security log or the statistical calculation result received in S201. The attack analysis may be performed by the same algorithm as that in the attack detection unit 105 of the log management device 100 of the vehicle, or more elaborate attack analysis. Generally known methods may be used as the attack analysis method.

When the analysis unit 203 determines that the specific vehicle is attacked or that additional analysis is necessary because it cannot determine whether there is an attack (S203: Yes), the process proceeds to S204. It may be further determined whether the necessary information for the additional analysis is needed from the specific vehicle or wider information collection is needed due to the risk such as a security hole spreading among the vehicles of the same time. When the analysis unit 203 determines that the specific vehicle is not attacked, the process ends.

In S204, the analysis unit 203 instructs the transmission unit 205 to transmit the upload request for collecting information from the specific vehicle, or some or all vehicles of the same type as the specific vehicle. Then, the transmission unit 205 transmits the upload request to the specific vehicle, or some or all vehicles of the same type as the specific vehicle. The vehicles of the same type to which the upload request is transmitted can be specified using registered vehicle data stored in the storage unit 204 of the center device 200.

The receiving unit 201 receives the security log or the statistical calculation result from a single vehicle which is the specific vehicle, or multiple vehicles which are some or all vehicles of the same type as the specific vehicle. In S205, the analysis unit 203 performs the attack analysis using the information. The specific vehicle may be included in the multiple vehicles.

According to the present embodiment, the center device 200 widely collects necessary information and performs the attack analysis.

Figure 7:
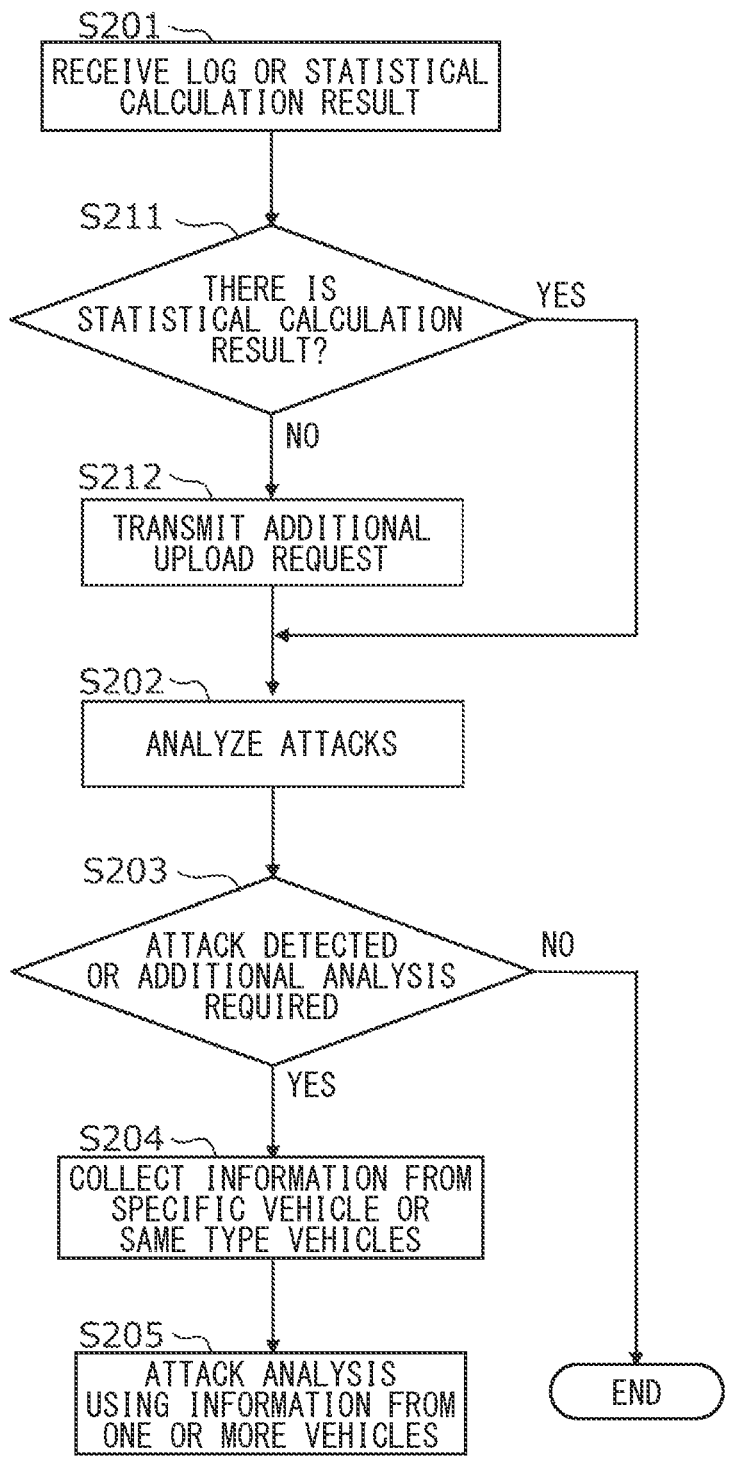
FIG. 7 is a flowchart illustrating operations of the center device according to the embodiment of the present disclosure.

FIG. 7 shows, as in FIG. 6, the operations of the center device 200 performed in response to receiving the security log or the statistical calculation result. Description of the same steps as in FIG. 6 will be omitted by citing the description of FIG. 6.

When the analysis unit 203 receives the security log from a specific vehicle in S201, the analysis unit 203 checks in S211 whether the analysis unit 203 has received and stored, in the storage unit 204, the statistical calculation result from the specific vehicle in the past. When the statistical calculation result has not been received in the past (S211: No), the analysis unit 203 instructs the transmission unit 205 to transmit additional upload request for the statistical calculation result to the specific vehicle. In S212, the transmission unit 205 transmits the upload request for the additional upload request. When the statistical calculation result has been received in the past (S11: Yes), the process proceeds to S202.

According to the present embodiment, the accuracy in the attack analysis can be improved by collecting enough information from the specific vehicle for the attack analysis by the center device 200.

3. Others (1) Change of Transmitted Log and Statistical Calculation Result

In S103 of FIGS. 4, 5, the predetermined condition is the detected number of attacks or the number of the security log. However, the predetermined condition may be automatically or manually set based on the location where the security sensor (e.g. a specific ECU) is installed or the importance of the communication bus to which the security sensor is connected. For example, the number of the detected attacks for the predetermined condition may be set.

The other logs and the predetermined condition may be changed for information related to safety and information related to privacy such as location information. For example, regarding the information related to safety, the amount of unprocessed raw data can be increased by increasing the detected number of attacks or the number of the security log which are the predetermined conditions. Regarding the information related to privacy, the amount of raw data which directly reveals the contents of the privacy can be decreased by decreasing the detected number of attacks or the number of the security log which are the predetermined conditions.

(2) Priority of Target Logs and Statistical Calculation Results

When transmitting the target log, the information related to safety and the information related to privacy such as location information may be given a higher priority and be sent in priority to other logs.

(3) Different Point of View of Invention

The present disclosure can be understood as the following aspect. The log management device (100) includes: a log collection unit (101) configured to receive a log generated by a security sensor; a storage unit (102) configured to store the log; a transmission unit (106) configured to transmit the log to an outside; and a statistical analysis unit (104) configured to obtain a statistical calculation result by performing statistical analysis on a plurality of the logs, and the transmission unit is configured to transmit the statistical calculation result to the outside instead of the log when a predetermined condition is satisfied.

4. General Overview

The features of the log management device, the center device, and the security attack detection and analyzing system in each embodiment of the present disclosure have been described above.

Terms used in the description of each embodiment are examples and may be replaced with synonymous terms or terms having a synonymous function.

The block diagram used in the description of each embodiment is a diagram in which the configurations of devices and the like are classified and organized by function. An individual function of the functional blocks may be implemented by (i) hardware alone (i.e., by using hardware circuitry including digital and/or analog circuits without CPU), or (ii) software alone (i.e., by using CPU along with memory storing program instructions), or (iii) any combination of the hardware and the software. Further, since the block diagram illustrates the functions, the block diagram can be understood as disclosure of the method and the program that implements the method.

Order of functional blocks that can be grasped as processing, a sequence, and a method described in relation to each embodiment may be changed unless some restriction is imposed, for example, a result from one step is utilized at another step.

The terms first, second, and N-th (N is an integer) used in each embodiment and the claims are used to distinguish two or more configurations of the same type and two or more methods of the same type and do not limit the order and superiority and inferiority.

In the above-described embodiments, the system is mounted in the vehicle. However, the present disclosure may be used for the system for special devices or general purpose devices other than vehicles.

In the above-described embodiment, the log management device is mounted on a vehicle. However, the log management device may be carried by a pedestrian.

Examples of forms of the log management device and the center device include the following forms. Examples of the security management device according to the present disclosure include a semiconductor device, an electronic circuit, a module, and a microcontroller. Examples of a form of a semifinished product include an electronic control device (electronic control unit (ECU)) and a system board. Examples of a form of a finished product include a cellular phone, a smartphone, a tablet computer, a personal computer (PC), a workstation, and a server. Further, the security management device may be a device having a communication function such as a video camera, a still camera, a car navigation system.

Necessary functions such as an antenna or a communication interface may be added to the log management device or the center device.

It is supposed that the center device of the present disclosure may be used to provide various services. In conjunction with providing such services, the center device of the present disclosure may be used, the method of the present disclosure may be used, or/and the program of the present disclosure may be executed.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program may be stored in a non-transitory tangible storage medium including (i) an external storage (e.g., hard disk, USB memory, CD/BD), or (ii) an internal storage (e.g., RAM, ROM) in a special-purpose or general-purpose hardware (e.g., computer). Such a program may be downloaded to the storage medium in the hardware via a communication link from a server. As a result, it is possible to provide a latest function by updating the program.

The log management device according to the present disclosure has been described mainly as a vehicle use purpose electronic control unit mounted on vehicle. The log management device may also be applied to general moving bodies such as pedestrians, motorcycles, bicycles with electric motors, railways, ships, and aircrafts. In addition, the log management device may also be applied to devices used for various purposes such as mobile phones, tablets, and gaming machines.

What is claimed is:

1. A log management device comprising:
a receiver receiving a log generated by a security sensor;
a processor and memory configured to:
store the received log in the memory;
obtain a statistical calculation result by performing statistical analysis on a plurality of the logs in the log management device;
determine which of the log and the statistical calculation result is to be sent, from the log management device to a center device, according to a predetermined condition; and
a transmitter transmitting, from the log management device to the center device, at least one of the log or the statistical calculation result according to the predetermined condition.

2. The log management device according to claim 1, wherein the processor and memory are further configured to:
detect an attack based on the log, and
obtain the statistical calculation result by performing the statistical analysis when the attack is detected a predetermined times or more.

3. The log management device according to claim 1, wherein the processor and memory are further configured to:
detect an attack based on the log, wherein
the predetermined condition is a number of detected attacks.

4. The log management device according to claim 3, wherein
the transmitter is further configured to
transmit the log when the number of detected attacks is equal to or less than a predetermined number, and
transmit the statistical calculation result after receiving an upload request from the center device when the number of detected attacks is greater than the predetermined number.

5. The log management device according to claim 3, wherein
the predetermined condition that is the number of detected attacks is set depending on a location where the security sensor is installed or an importance of a communication bus to which the security sensor is connected.

6. The log management device according to claim 1, wherein the processor and memory are further configured to:
receive an upload request from the center device for uploading at least one of the log or the statistical calculation result, wherein
the predetermined condition is the upload request.

7. The log management device according to claim 6, wherein
the predetermined condition is an amount of the log in addition to the upload request.

8. The log management device according to claim 7, wherein
the transmitter is further configured to
transmit the log when the amount of the log is equal to or less than a predetermined amount, and
transmit the statistical calculation result when the amount of the log is greater than the predetermined amount.

9. The log management device according to claim 6, wherein the transmitter is further configured to transmit at least one of the log or the statistical calculation result based on latest one of the upload request when the at least one of the log or the statistical calculation result becomes transmittable after a situation where the at least one of the log or the statistical calculation result is untransmittable.

10. The log management device according to claim 1, wherein
the log management device is mounted in a moving body.

11. A log management method implemented by a processor and memory, the processor executing instructions of a program stored in the memory of the log management device, the instructions comprising:
receiving a log generated by a security sensor;
storing the received log in the memory;
obtaining a statistical calculation result by performing statistical analysis on a plurality of the logs in the log management device;
determining which of the log and the statistical calculation result is to be sent, from the log management device to a center device, according to a predetermined condition; and
transmitting, from the log management device to the center device, at least one of the log or the statistical calculation result according to the predetermined condition.

12. A computer program product stored on at least one non-transitory computer readable medium and comprising instructions configured to, when executed by at least one processor of a log management device, cause the at least one processor to:
receive a log generated by a security sensor;
store the received log in the computer-readable non-transitory storage medium;
obtain a statistical calculation result by performing statistical analysis on a plurality of the logs in the log management device;
determine which of the log and the statistical calculation result is to be sent, from the log management device to a center device, according to a predetermined condition; and
transmit, from the log management device to the center device, at least one of the log or the statistical calculation result according to the predetermined condition.

13. A security attack detection and analyzing system comprising:
a log management device; and
a center device, wherein
the log management device includes:
a processor and first memory configured to:
receive a log generated by a security sensor,
store the received log in the first memory,
obtain a statistical calculation result by performing statistical analysis on a plurality of the logs in the management device,
determine which of the log and the statistical calculation result is to be sent, from the log management device to a center device, according to a predetermined condition, and
transmit, from the log management device to the center device, at least one of the log or the statistical calculation result according to the predetermined condition, and
the center device includes
a receiver receiving the at least one of the log or the statistical calculation result, a second memory, a controller, by executing a program stored in the second memory, analyzing the at least one of the log or the statistical calculation result, and generating an upload request for at least one of an additional log or an additional statistical calculation result based on a result of the analysis, and a transmitter transmitting transmission unit configured to transmit the upload request to the log management device.

14. The security attack detection and analyzing system according to claim 13, wherein the log management device is mounted in a moving body, and the transmitter of the center device is configured to transmit the upload request to at least one of the log management device of the moving body or the log management device mounted in another moving body of a same type.

* * * * *